J. A. HOCK.
PIPE TESTING APPARATUS.
APPLICATION FILED SEPT. 28, 1906.

906,495.

Patented Dec. 8, 1908.
2 SHEETS—SHEET 1.

Fig. 1.

WITNESSES

INVENTOR
Jno. A. Hock,
by Bakewell & Byrnes
his Attys

J. A. HOCK.
PIPE TESTING APPARATUS.
APPLICATION FILED SEPT. 28, 1906.
906,495.
Patented Dec. 8, 1908.
2 SHEETS—SHEET 2.
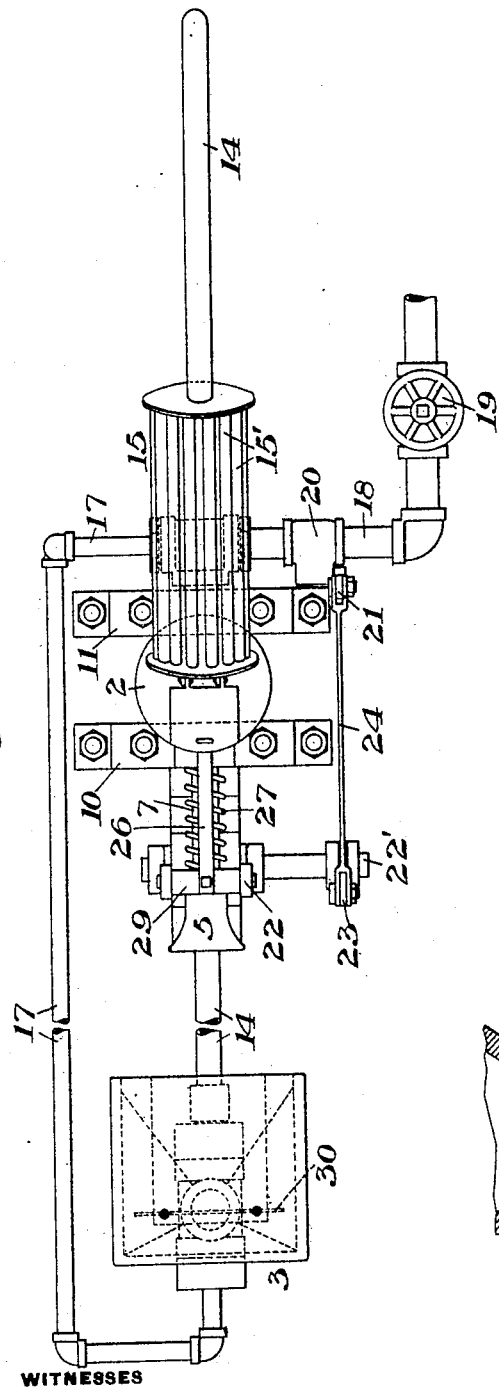
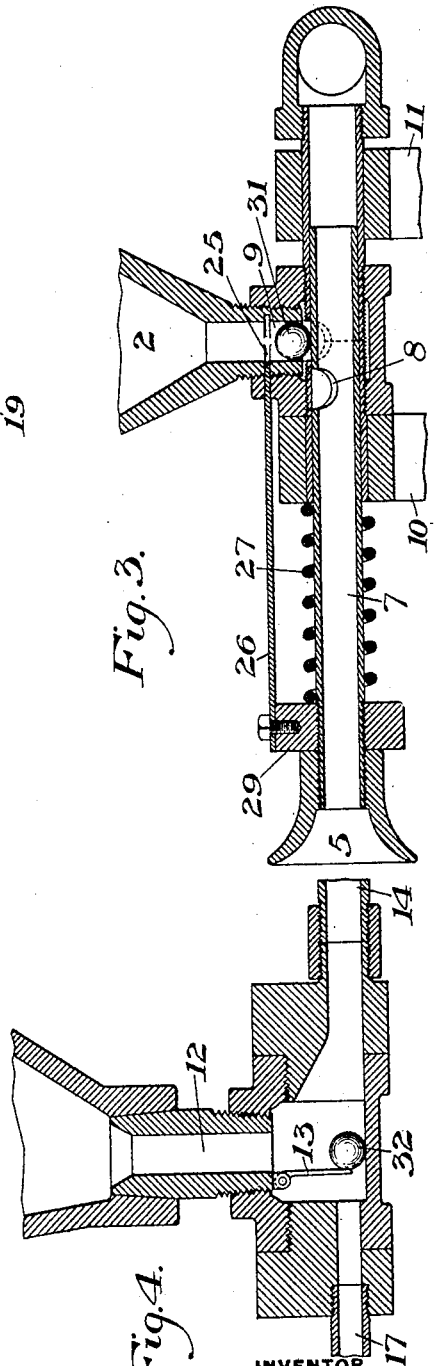
WITNESSES
INVENTOR

UNITED STATES PATENT OFFICE.

JOHN A. HOCK, OF PITTSBURG, PENNSYLVANIA, ASSIGNOR TO NATIONAL TUBE COMPANY, OF PITTSBURG, PENNSYLVANIA, A CORPORATION OF NEW JERSEY.

PIPE-TESTING APPARATUS.

No. 906,495.     Specification of Letters Patent.     Patented Dec. 8, 1908.

Application filed September 28, 1906.  Serial No. 336,638.

To all whom it may concern:

Be it known that I, JOHN A. HOCK, of Pittsburg, Allegheny county, Pennsylvania, have invented a new and useful Pipe-Testing Apparatus, of which the following is a full, clear, and exact description, reference being had to the accompanying drawings, forming part of this specification, in which—

Figure 1 is a side elevation of my improved apparatus and Fig. 2 is a plan view of the same; Fig. 3 is a sectional view on a larger scale, showing the details of the valve mechanism for the delivery hopper and Fig. 4 is a similar sectional view showing the valve mechanism for the receiving hopper.

My invention relates to apparatus used in testing pipes or tubes and it more particularly relates to apparatus employed in testing tubes used in making electrical conduits.
In such conduit tubes it is necessary that they be tested to insure that the inside of these tubes are free from any projections or obstructions that would prevent the wires from being inserted in them. Heretofore the manner in which this testing operation has been done was to force a testing ball of the desired diameter through each pipe by means of a long rod, one operator being required to handle and hold the pipe while a second operator by means of the rod pushed or drove the ball through the pipe. This has been a very slow and expensive operation.

The object of my invention is to provide improved apparatus by the use of which the tubes are easily and quickly tested and in the use of which the time required and the labor necessary in testing the tubes is greatly lessened and the expense of performing this operation is largely reduced.

My invention consists in an improved apparatus in which the balls or gages used in testing are caused to pass through the pipes being tested by means of air or other fluid pressure and in which the gages used are automatically returned to place in readiness to be again used for testing another pipe. The invention also consists in the construction and arrangement of the apparatus as more fully described hereinafter.

In the drawings, 2 represents the delivery hopper from which the balls are passed into position to be forced through the pipe being tested and into which hopper the balls are delivered from the receiving hopper.

3 is the receiving hopper into which the balls are passed from the tested tubes, 4 represents a tube as it is held in place by the operator while being tested. The end of the tube 4 is placed in the end of the bell 5 by the operator, one end of the tube being brought into line with the opening 6 located in the side of the receiving hopper 3. The bell 5 is secured to the end of the longitudinally movable pipe 7 and this pipe 7 is provided with an upwardly extending opening 8. The lower end of the hopper 2 is provided with a downwardly extending opening 9. The hopper 2 is rigidly secured in place by means of the supports 10 and 11 on a suitable foundation, (not shown). The receiving hopper 3 is also provided on its lower end with an opening 12 which opening is provided with an upwardly seating hinged flap valve 13. The valve 13 is normally held open by gravity and is adapted to close when fluid pressure is admitted into the pipes employed in delivering the balls from this hopper into the hopper 2 and in this way to close the opening 12 and prevent escape of the fluid pressure through the opening 12 and the hopper 3.

Secured to the lower end of the hopper 3 is a pipe 14 which extends longitudinally and is curved upwardly to a point above the top of the delivery hopper 2. On the end of the pipe 14 above the top of the hopper 2 is a cylindrical cage or screen 15 which is constructed of a series of rods or bars 15′ so as to form a slotted conveyer or chute. The bars 15′ are placed closely enough together to prevent the balls from dropping through the openings between these bars and are separated from one another so as to permit of any scale or other foreign material delivered to the cage to drop between the bars and in this way to prevent it from being carried into the hopper 2. The hopper 2 and the receiving hopper 3 are connected together by the fluid pressure supply pipe 17 and both of these pipes 17 are connected by the pipe 18 with a source of fluid pressure supply.

The pipe 18 is provided with a globe valve 19 by means of which the fluid pressure supply may be shut off from the testing apparatus. The pipe 18 is also provided with a valve 20 which is opened and closed by means of a lever arm 21. The bell 5 on the end of the longitudinally movable pipe 7 is connected by means of a yoke 22 with the rock-shaft 22' and on the end of this rock shaft is a lever arm 23 which is connected to the valve operating lever 21 by means of a link 24. The lower end of the hopper 2 is provided with a gate 25 which is normally held open and which is adapted to be closed by the shutter or slide 26 which is operated by the movement of the longitudinally movable pipe 7. The pipe 7 is provided with a spring 27 which keeps the pipe in its forward position until such time as it is moved by the operator when testing the tube. A stop 28 is provided which by engagement with the collar 29 on the longitudinally movable pipe 7, limits the stroke of this pipe. On the interior of the hopper 3 a plate or bell 30 is suspended in such position that when the ball is delivered from the tube being tested it will strike this plate and in this way give notice to the operator that the testing ball has passed through the tube being tested and that the tube being tested is clear and is free from any obstruction on its inner surface.

The operation of the apparatus is as follows:—The parts being in the position shown, the end of the tube 4, which is to be tested, is placed in the mouth of the bell 5 by the operator, the other end of the pipe being placed in line with the opening in the side of the hopper 3. The operator then moves the pipe 4 and the bell 5 forward until the opening 8 in the endwise movable pipe 7 registers with the opening 9 in the lower end of the hopper 2. The ball 31 which has been placed in the hopper 2 then drops into the pipe 7. The movement of the pipe 7 also moves the shutter or slide 26 so as to close the gate 25 and prevent escape of the fluid pressure. This same movement of the pipe 7 also moves the valve lever 21 through the yoke 22, the shaft 22', the lever arm 23 and link 24 to open the valve and admit fluid pressure from the pipe 18 into the pipe 17 and also into the pipe 7. The force of this fluid pressure drives the ball 21 forward into and through the tube 4 which is being held by the operator with one of its ends in the mouth of the bell 5 and causes the testing ball to be carried into the hopper 3, the ball striking against the signal 30 and dropping into the lower part of the hopper 3, the opening 12 at this time being closed by the flap valve 13 which is held in its closed position by the fluid pressure in the pipe 17. By the same opening movement of the fluid pressure valve 20, pressure is also admitted to the pipe 17 and through it into the pipe 14. The second ball 32 which had been placed in the hopper 3, is in this way caused by the fluid pressure in the pipe 17 to pass through the pipe 14 into the cage 15 from which it drops into the hopper 2 in readiness to be again used in testing another tube. The operation above described is then repeated in testing other tubes.

When, on account of obstructions or defects on the inner surface of any of the tubes being tested, the ball is not forced through this tube after the fluid pressure has been applied, the operator lays such tube aside and proceeds to test another. Any pipes having obstructions in their interior which prevents the ball from passing through them are afterwards subjected to a hand driving operation to remove such obstructions.

The advantages of my invention will be apparent to those skilled in the art. By its use one operator can test a large number of pipes. The time required in making each test is greatly reduced and the cost of performing this operation is lessened. The testing ball or gage is preferably made spherical in shape although its shape may be changed if desired. The testing balls are automatically delivered in position to be again used. The apparatus is simple and easily kept in repair.

Many modifications in the construction and arrangement of the apparatus may be made without departing from my invention.

I believe I am the first to employ apparatus using fluid pressure to cause the testing ball or gage to pass through the pipe and I intend to cover the same broadly.

I claim:—

1. Apparatus for testing tubes, comprising a ball runway having an open section into which the tubes to be tested are inserted to form temporarily a section of the runway, a testing ball, and means for automatically passing said ball through the tubes and runway as the tubes are successively brought into position to receive the ball; substantially as described.

2. Apparatus for testing tubes comprising a testing ball, a ball delivery hopper, means for passing the ball through the delivery hopper to successive tubes as they are brought into position to receive the ball and means for returning the ball to said delivery hopper; substantially as described.

3. Apparatus for testing tubes comprising a testing ball, a ball delivery hopper, a ball receiving hopper, means whereby said ball is passed from the delivery hopper to the tubes, means for passing the ball through the tubes into said receiving hopper, as they are brought into position to receive the ball and means for returning the ball from the receiving hopper into said delivery hopper; substantially as described.

4. Apparatus for testing tubes comprising a testing ball, a ball delivery hopper, means for passing the ball from the delivery hopper to the tubes as they are successively brought into position to receive the ball and fluid pressure means for returning the ball to said delivery hopper; substantially as described.

5. Apparatus for testing tubes comprising a testing ball, a ball delivery hopper, a ball receiving hopper, fluid pressure means for passing the ball from the delivery hopper through the tubes into said receiving hopper and for returning the ball from the receiving hopper into said delivery hopper as the successive tubes are brought into position to receive the ball; substantially as described.

6. Apparatus for testing tubes comprising a testing ball, a ball delivery hopper, a ball receiving hopper, fluid pressure means for passing the ball from the delivery hopper through the tubes into said receiving hopper, as they are brought into position to receive the ball and fluid pressure means for returning the ball from the said receiving hopper into said delivery hopper; substantially as described.

7. Apparatus for testing tubes comprising a testing ball, a ball delivery hopper, means for passing the ball from said delivery hopper into the tubes, fluid pressure means for passing the ball from the said hopper through the tubes and mechanism for automatically operating the ball moving means as the tubes are successively brought into position to receive the ball; substantially as described.

8. In apparatus for testing tubes, a passage arranged to communicate with an end of the tube being tested, to which the tubes to be tested are successively brought, a testing gage adapted to be driven through the tubes to be tested, a source of pressure supply connected to said passage, and means controlling the pressure to drive the gages through the tubes as they are successively brought into communication with said passage, substantially as described.

9. Apparatus for testing tubes comprising a ball delivery hopper, a passage arranged to communicate with an end of the tube to be tested, a fluid pressure supply communicating with said passage, valve mechanism operated by the end of the tube for controlling the fluid pressure and a return passage for the ball arranged to communicate with the opposite end of the tube being tested; substantially as described.

10. Apparatus for testing tubes comprising a ball delivery passage arranged to communicate with an end of the tube to be tested, a fluid pressure supply communicating with said passage and valve mechanism for controlling the fluid pressure, a return passage for the ball arranged to communicate with the opposite end of the tube and a screen in the end of the said passage; substantially as described.

11. In tube testing apparatus, a ball delivery hopper, a delivery passage, a fluid pressure supply communicating with the passage and valve mechanism arranged to simultaneously open the passage and close the hopper as successive tubes are brought into position to receive the ball; substantially as described.

12. In tube testing apparatus, a ball delivery hopper, a delivery passage, a fluid pressure supply communicating with the passage and valve mechanism arranged to simultaneously open the passage and close the hopper and admit the fluid pressure; substantially as described.

13. In tube testing apparatus, a hopper, an endwise movable delivery pipe having an opening arranged to communicate with the hopper, a fluid pressure supply controlled by the movement of the pipe and mechanism controlled by the movement of the pipe for simultaneously connecting the supply with the pipe and closing the hopper; substantially as described.

14. In tube testing apparatus, a hopper, an endwise movable delivery pipe having an opening arranged to communicate with the hopper, a fluid pressure supply controlled by the movement of the pipe and mechanism controlled by the movement of the pipe for simultaneously connecting the supply with the pipe and closing the hopper and means for automatically closing the pressure supply; substantially as described.

15. In tube testing apparatus, a hopper, an endwise movable delivery pipe having an opening arranged to communicate with the hopper, a fluid pressure supply controlled by the movement of the pipe and mechanism controlled by the movement of the pipe for simultaneously connecting the supply with the pipe and closing the hopper and means for automatically closing the pressure supply and the opening in the endwise movable pipe; substantially as described.

16. In tube testing apparatus, a hopper, an endwise movable delivery pipe having an opening arranged to communicate with the hopper, a fluid pressure supply, a shutter for closing the hopper to prevent escape of the fluid pressure and mechanism controlled by the operator for simultaneously operating the shutter, the fluid pressure supply and the shutter; substantially as described.

17. In apparatus for testing tubes, a testing ball, and fluid pressure means for driving the ball through the tube to be tested, substantially as described.

18. Apparatus for testing tubes comprising a testing ball, and fluid pressure means for entering and forcing said ball through the tube to be tested, substantially as described.

19. The method of testing tubes which consists in inserting a gage in the tube to be tested and then forcing said gage through the tube by means of fluid pressure; substantially as described.

20. The method of testing tubes which consists in placing a gage in the end of the tube to be tested, connecting the end of the tube with a source of fluid pressure supply, and then forcing said gage through the tube by means of fluid pressure; substantially as described.

In testimony whereof, I have hereunto set my hand.

JOHN A. HOCK.

Witnesses:
H. R. GILBERT,
ROBERT M. ERSKINE.